United States Patent [19]

Nadolink

[11] Patent Number: 5,433,002
[45] Date of Patent: Jul. 18, 1995

[54] FABRICATION PROCESS FOR COMPLEX COMPOSITE PARTS

[75] Inventor: Richard H. Nadolink, Portsmouth, R.I.

[73] Assignee: The United States of America as represented by the Secretary of the Navy, Washington, D.C.

[21] Appl. No.: 243,028

[22] Filed: May 5, 1994

[51] Int. Cl.$^6$ .............................................. B23P 15/00
[52] U.S. Cl. ................................... 29/889.6; 29/527.2; 29/889.71; 427/456
[58] Field of Search ............... 29/889.71, 889.6, 527.2, 29/530; 427/446, 456, 299, 404

[56] References Cited

U.S. PATENT DOCUMENTS

| | | | |
|---|---|---|---|
| 1,528,581 | 3/1925 | Steenstrup | 29/889.71 |
| 4,776,076 | 10/1988 | Frank et al. | 29/527.2 |
| 4,990,205 | 2/1991 | Barbier et al. | 29/889.6 |
| 5,042,968 | 8/1991 | Fecto | 29/889.6 |
| 5,104,293 | 4/1992 | Eaton, Jr. et al. | 416/241 B |
| 5,123,814 | 6/1992 | Burdick et al. | 29/889.71 |
| 5,269,658 | 12/1993 | Carlson et al. | 29/889.71 |

Primary Examiner—Irene Cuda
Attorney, Agent, or Firm—Michael J. McGowan; Prithvi C. Lall; Michael F. Oglo

[57] ABSTRACT

A method for manufacturing a composite part is provided. A polymer material is formed into a shape whose outer surface has a desired part configuration. A base coating is applied to substantially all of the outer surface leaving at least one access to the polymer material. The base coating includes a selected metal existing as a constituent thereof. The same selected metal is then sprayed in atomized form on the base coating covered outer surface. The selected metal in atomized form molecularly bonds only to the selected metal existing as a constituent of the base coating. The polymer material is then contacted with a polymer solvent by means of the access. The polymer solvent molecularly breaks down the polymer material such that it exits the access. As a result, the selected metal in atomized form bonded with the selected metal existing as a constituent of the base coating forms a metallic shell substantially void of the polymer material. Fill material selected design performance characteristics is introduced into the metallic shell thereby forming the composite part.

15 Claims, 3 Drawing Sheets

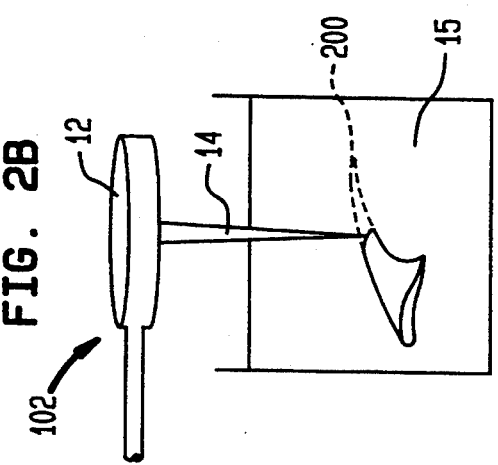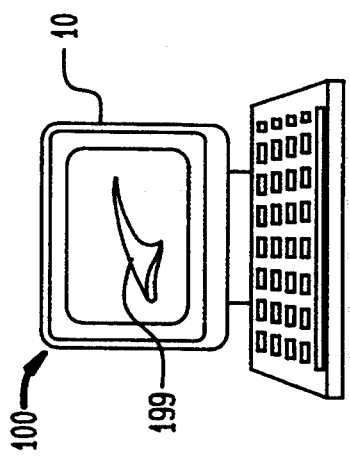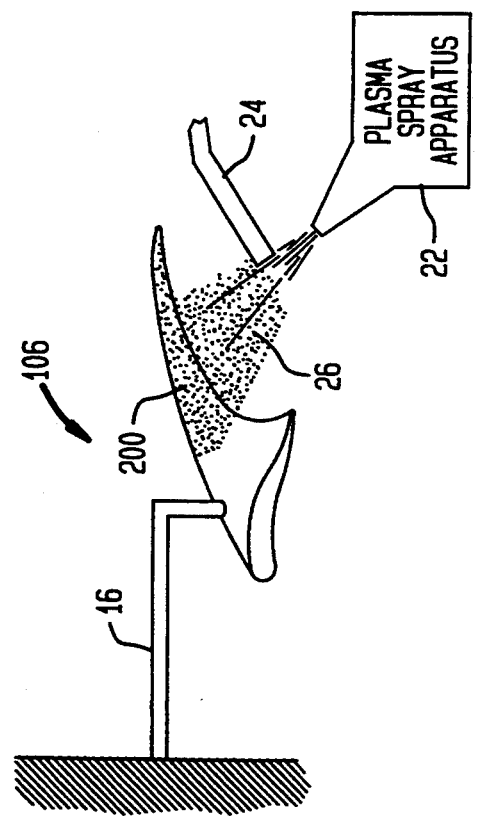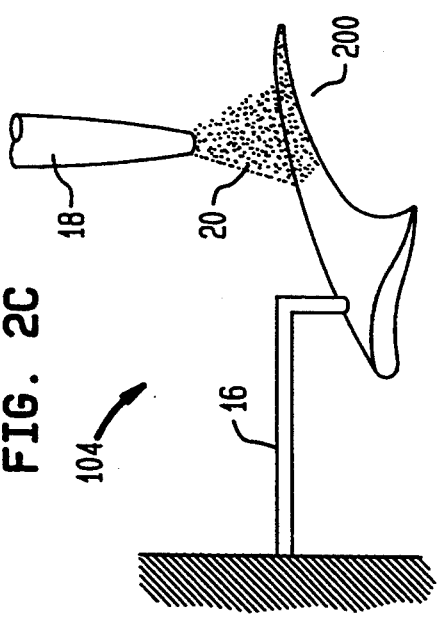

FABRICATION PROCESS FOR COMPLEX COMPOSITE PARTS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The present invention relates generally to part fabrication processes, and more particular to a fabrication process for making complex composite parts such as marine propeller blades.

2. Description of the Prior Art

Complex parts such as marine propulsors/propellers are designed in accordance with well known aero/hydrodynamic theory. The first object of design in both aero and hydrodynamic scenarios is to provide the desired lift force suitable to propel or thrust the body forward. The underlying principles are the same for both the aero and hydrodynamic scenarios. However, operational constraints placed on marine propulsors/propellers challenge designers to meet conflicting physical constraints. This is especially true in the case of submersible vehicles. The most important of these physical constraints include design features/materials that achieve:

high efficiency to conserve propulsive energy, fuel, powerplant size and weight;
high thrust to provide a top speed which does not waste propulsor power;
high strength to prevent distortions and breakage, while minimizing size and weight;
low vibration and noise to minimize the amount of acoustic power radiation that is transmitted into the water or to the attached vehicle which is being propelled;
low cost of manufacture and maintenance; and
high resistance to external and internal corrosion and chemical attack due to the harsh nature of the marine environment.

In particular, propulsors/propellers that are to produce a high thrust at a high efficiency while presenting a low noise signature pose the greatest challenge because of the vastly conflicting design/manufacturing constraints. For example, the most efficient blade design may be too large/heavy to meet the desired strength characteristics needed to carry required loads at acceptable amounts of distortion. The most cost effective design may be too imprecise to meet the geometric specifications, thereby losing efficiency. The quietest design may not be possible because a single material is not available or is not practical for manufacture of either the scaled, prototype, or manufacturing phases. Thus, the design of marine propulsors/propellers has advanced to the point of specifying not only a complex shape, but ideally a composite construction using multiple materials in order to best satisfy all of the design performance constraints. Unfortunately, many materials well suited for marine propulsor/propeller fabrication have little or no value in the ultimate part design. Similarly, at the other end of the spectrum, materials well suited for ultimate marine propulsor/propeller performance frequently tax the fabrication process in terms of complexity, time and/or expense.

SUMMARY OF THE INVENTION

Accordingly, it is an object of the present invention to provide an improved fabrication process for complex parts such as marine propulsors and/or propeller blades.

Another object of the present invention is to provide an improved fabrication process for producing a complex part meeting both geometric and physical design constraints.

It is a further object of the present invention to provide an improved fabrication process for complex parts capable of achieving both a complex shape and a composite structure utilizing multiple materials in an effort to satisfy design performance constraints.

Other objects and advantages of the present invention will become more obvious hereinafter in the specification and drawings.

In accordance with the present invention, a method for manufacturing a composite propeller blade member is provided. A polymer material is formed into a shape whose outer surface has a desired propeller blade member configuration. A mask is applied to a portion of the polymer propeller blade's outer surface. A base coating is applied to the polymer propeller blade's outer surface. The base coating includes a selected metal as a constituent thereof. The same selected metal is then plasma or flame sprayed in atomized form on the base coating covered outer surface. The selected metal in atomized form molecularly bonds to the selected metal existing as a constituent of the base coating and a continuous, homogeneous coating is built up in layers. The mask is removed thereby revealing an access to the polymer material through the selected metal bonded with the base coating. The polymer material is brought into contact with a polymer solvent via the access. The polymer solvent is selected to molecularly break down the polymer material into a liquid that exits the access. As a result, the selected metal bonded with the selected metal existing as a constituent of the base coating forms a metallic shell substantially void of the polymer material. Finally, a fill material is introduced into the metallic shell by means of the access for forming the composite propeller blade member. The fill material is selected to have characteristics suitable for a propulsion system of which the composite propeller blade member will be a part.

BRIEF DESCRIPTION OF THE DRAWING

Other objects, features and advantages of the present invention will become apparent upon reference to the following description of the preferred embodiments and to the drawings, wherein:

FIGS. 2A–2G depict a process flow showing an apparatus used to carry out the fabrication method as it relates to a marine propeller blade.

DESCRIPTION OF THE PREFERRED EMBODIMENT

Figure 1:
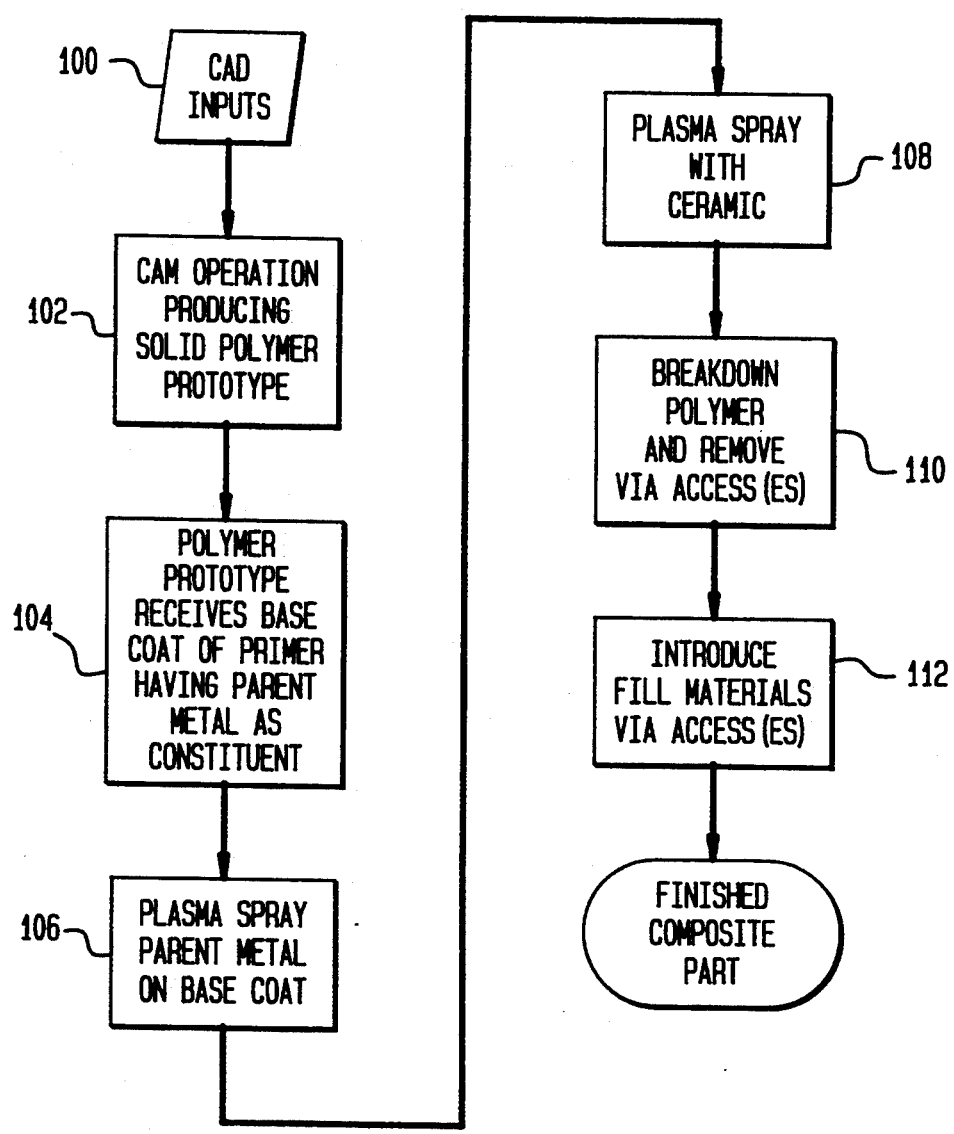
FIG. 1 is a process flow showing the complex part, composite structure fabrication method of the present invention.
Figure 2F:
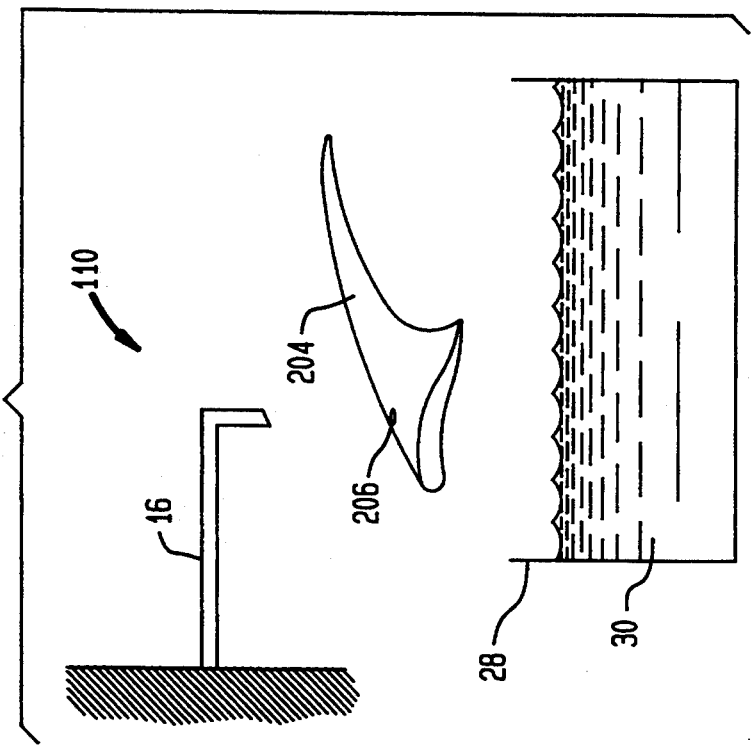

Referring now to the drawings, and more particularly to FIG. 1, a process flow diagram is shown and will be used to describe an embodiment of the present invention. By way of example, the fabrication process and product produced thereby will be described for a marine propulsor/propeller blade member having a complex construction. However, it is to be understood that the process of the present invention can be extended to the fabrication of a variety of parts having complex constructions. In the sense of the present invention, complex construction refers to a three-dimensional shape that: 1) is defined by a continuous or discontinuous curve in space, 2) is made up of multiple layers of different materials with molecular continuity between each layer, and 3) the whole part cannot necessarily be described by any known material constitutive equation for stress, strain or state. Following a description of FIG. 1, the process flow shown in FIG. 2 will be used to describe an apparatus for carrying out the fabrication process of the present invention as it relates to a propeller blade.

As is known in the art, marine propeller blades are designed today in accordance with very complex analytical procedures to yield precise surface geometries. These surface geometries are typically specified as a set of three-dimensional axis offsets generated by computer aided design (CAD) equipment. The CAD outputs defining the propeller blade are used as inputs to drive computer aided machining (CAM) equipment such as lathes, mills, three-dimensional printers, stereolithography apparatus, selective laser sintering, laminated object manufacturing, ballistic particle manufacturing, fused deposition modeling, etc. Accordingly, in step 100 a set of CAD inputs are provided to an appropriate CAM apparatus in step 102.

For purposes of the illustrative example, the CAD inputs are supplied to a stereolithography apparatus (SLA) which produces the complex design in the form of a raw solid polymer part, e.g., a polymer propeller blade. One such SLA system in the SLA-500 manufactured by 3D Systems, Inc. A simple oven heating process then cures the part and is a function of material type, time and temperature. As will become apparent below, the polymer material should be selected such that it is readily dissolved in the presence of a suitable polymer solvent. A wide variety of organic polymer materials are possible and can be selected based on the particular prototype part fabrication equipment, cost, availability, ease of dissolution, etc. Accordingly, the particular polymer material is not a limitation of the present invention. By way of example, a liquid photo polymer such as DuPont's SOMOS 2100 produces flexible, solid opaque parts with smooth surfaces after undergoing the SLA process. Typical solvents that can be used to dissolve this resin are isopropyl alcohol, dipropylene glycol, methyl ether and toluene, just to name a few.

As part of the polymer propeller blade fabrication in step 102, the part may optionally undergo a variety of surface finishing processes. Although not shown in FIG. 1, the surface of the polymer propeller blade can undergo abrasion sanding, chemical dissolution, etc. to achieve the desired/necessary degree of surface smoothness. As a result, the polymer propeller blade completed in step 102 has the desired intermediate processing dimensions for the complex shape of the ultimate finished propeller blade. Since the part will undergo several coating steps, the shape of the part after step 102 is geometrically similar, i.e., scaled, relative to the ultimate finished part.

The next major portion of the fabrication process is accomplished in two steps and provides a metal coating on the surface of the polymer propeller blade. The metal coating will provide the necessary external skin strength and rigidity. First, in step 104, the majority of the polymer propeller blade surface receives a base coating of primer paint selected for its ability to adhere to the polymer material. Any commercially available primer paint containing a selected parent metal or alloy, e.g., aluminum or an aluminum alloy in the case of fabricating a propeller blade, as a constituent thereof can be used. The primer paint can be hand brushed/sprayed or applied by means of appropriate CAM equipment.

As mentioned above, not all of the polymer propeller blade surface is coated with the primer paint. A portion (or portions) of the surface is not coated or is masked off such that, when the mask is removed, direct access to the polymer material is possible. Masking can take the form of a separate step (not shown). However, more typically, masking is easily achieved since the propeller blade must be held in a jig during the two-step metal coating portion of the fabrication process. Whenever possible, it is desirable to achieve the masking at a location on the part where the surface discontinuity brought about by the masking will be inconsequential. In terms of a propeller blade, masking an access is done at what will be the root juncture of the ultimate propeller blade. As part of step 104, the primer painted polymer propeller blade is suitably cleaned with a flow of dry gas (e.g., nitrogen, argon) and/or solvents.

In step 106, the primer painted polymer propeller blade is plasma spray coated with the same metal or alloy as that used in the primer paint of step 104. As in step 104, the plasma spray coating in step 106 may be accomplished by hand or under CAM control to a desired thickness. The plasma spray process atomizes the metal such that when the atomized metal contacts the primer painted polymer propeller blade, the atomized metal molecularly bonds with the parent metal that is contained in the primer paint. This is done to achieve a continuous, homogenous coating which is typically built up in layers. As part of step 106, the surface of the metal coating can undergo a variety of surface finish techniques as required. Such techniques are well known in the art and will not be described herein.

The primer paint in step 104 forms a thin painted layer on the polymer material and acts as a molecular bonding base for the flame or plasma sprayed selected metal or alloy in step 106. The more desirable metal or alloys, e.g., aluminum and its alloys, will not adhere to a non-metal surface if flame or plasma sprayed directly thereon. Accordingly, the paint primer is applied as a molecular adhesive for the spray coating in step 106.

While not a requirement for all complex parts, the metal coated polymer propeller blade typically undergoes an additional plasma spray treatment shown as step 108. In step 108, a ceramic material capable of molecularly bonding with the metal used in step 106 is plasma sprayed onto the metal coating. The atomized ceramic molecularly bonds to the metal coating to provide a particular hardness, corrosion resistance or dielectric exterior required of the ultimate finished part. For example, if the selected parent metal were aluminum, the preferred ceramic could be alumina since alumina is the best dielectric for protecting an aluminum surface from corrosion.

Next, in step 110, the mask(s) applied to the surface of the polymer propeller blade as part of step 104 is (are) removed to provide direct access to the underlying polymer material. The polymer material is then contacted with a suitable solvent that molecularly breaks down the polymer such that the polymer and solvent can exit the provided access(es). Depending on the choice of polymer material/solvent, the dissolution process may be enhanced by the addition of heat. Once the polymer material is broken down/removed, a metal shell (or ceramic coated metal shell) having the desired propeller blade shape remains.

The shell now has all of surface characteristics required of the ultimate propeller blade. The void in the shell left by the removal of the polymer material allows for the introduction at step 112 via the access(es), of a variety of fill materials selected based on the characteristics required of the ultimate composite structure. The fill material in terms of a propeller blade can be selected to enhance the acoustic damping and/or strength characteristics of the ultimate propeller blade. Thus, the fill material can take the form of fiber reinforcing strands, packed powders, sintered material, cellular material, molten metals/alloys, etc. Further, depending on the location of the access(es), the fill material selected and method of introducing the fill material, voids in the shell can be left intentionally to provide for acoustic mismatch of sound speeds within the ultimate propeller blade.

An apparatus for carrying out the above-described fabrication process for a complex shape propeller blade will now be described with the aid of FIGS. 2A-2G. Steps 100-112 appear respectively in FIGS. 2A-2G as reference numbers generally indicating the apparatus associated therewith. In step 100, CAD system 10 provides a set of three-dimensional coordinates capable of describing complex shape 199 representing a propeller blade. In step 102, the three-dimensional coordinates are input to appropriate CAM equipment such as SLA 12 which, using laser beam 14, produces polymer propeller blade 200 in photopolymer bath 15. After being cured, polymer blade 200 is held by jig 16 (at step 104) within an area that will be the root juncture of the finished propeller blade. Thus, jig 16 serves to mask a portion of polymer blade 200 that will become an access to the polymer material later in the process. While only a single location of contact is shown for sake of clarity, it will be well understood by those in the art that jig 16 may contact, i.e., mask, polymer blade 200 in multiple locations for purposes of support, providing additional accesses, or both. Sprayer 18 is then used to coat polymer blade 200 with a primer paint having a selected parent metal as a constituent thereof and is referenced in FIG. 2C by dashed lines 20.

Figure 2E:
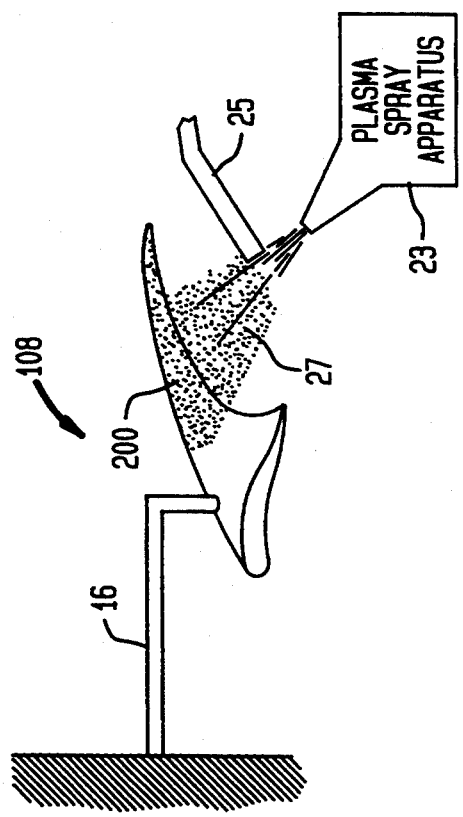
Figure 2G:
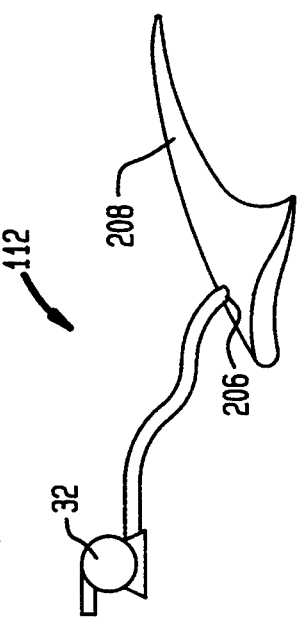

The resulting primer painted polymer blade, now referenced by numeral 202 in step 106, is plasma spray coated by plasma spray apparatus 22 with substantially the same selected parent metal 24 as that in the primer paint. Parent metal 24 is atomized as represented by dots 26 prior to contacting the surface of primer painted polymer blade 202. As mentioned above, atomized parent metal 26 molecularly bonds with the parent metal existing as a constituent of the primer paint. In FIG. 2E, step 108 can be accomplished with similar apparatus, i.e., plasma spray apparatus 23 atomizes ceramic 25 as represented by dots 27, to apply a ceramic coating to the metal coated polymer blade.

Once the coating steps are completed, the resulting metal (and possibly ceramic) coated polymer blade, now-referenced by numeral 204 in step 110, is removed from jig 16. This essentially "unmasks" coated polymer blade 204 to reveal access 206. At this point, the polymer material within coated polymer blade 204 is brought into contact with a polymer solvent via access 206. This can be accomplished, for example, by dipping coated polymer blade 204 in a bath 28 of polymer solvent 30 until all of the polymer material in its molecularly broken down state has exited access 206. The resulting metal shell propeller blade (or possibly ceramic coated metal shell propeller blade), referenced by numeral 208 in step 112, is then filled/pumped with appropriate fill material(s) (not shown) by means of, for example, fill pump 32.

The advantages of the present invention are numerous. Today's precise CAD/CAM equipment is first utilized to form the particular complex shaped part from a material that optimizes the CAD/CAM's capability with respect to precision of geometry. Then, through a series of steps, a composite structure part is generated to optimize the part for its ultimate application while maintaining the precise geometric shape. In this way, the present invention provides a complex part fabrication process capable of satisfying strict geometric constraints as well as a variety of ultimate physical property constraints.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for manufacturing a composite propeller blade member, comprising the steps of:

forming a polymer material into a shape whose outer surface has a propeller blade member configuration;

masking a portion of said outer surface with a mask;

applying a base coating to said outer surface, said base coating including a selected metal existing as a constituent thereof;

spraying, in atomized form, said selected metal on said base coating covered outer surface, said selected metal molecularly bonding to said selected metal existing as a constituent of said base coating;

removing said mask to provide an access to said polymer material through said selected metal and said base coating;

contacting, by means of said access, said polymer material with a polymer solvent selected to molecularly break down said polymer material into a liquid that exits said access, wherein said selected metal bonded with said selected metal existing as a constituent of said base coating forms a metallic shell substantially void of said polymer material; and introducing, by means of said access, a fill material into said metallic shell for forming said composite propeller blade member, said fill material having characteristics suitable for a propulsion system of which said composite propeller blade member will be a part.

2. A method according to claim 1 wherein said step of forming is a computer aided design/computer aided manufacturing process.

3. A method according to claim 1 wherein said mask is placed on said shape of said polymer material at a location that will be a root juncture of said composite propeller blade member.

4. A method according to claim 1 wherein said step of spraying comprises a plasma spray process.

5. A method according to claim 1 further comprising the step of spraying, in atomized form, ceramic material on top of said selected metal, said ceramic material being a ceramic capable of molecularly bonding with said selected metal.

6. A method acceding to claim 1 wherein said selected metal is selected from the group consisting of aluminum and aluminum alloys.

7. A method according to claim 1 wherein said polymer material is an organically soluble polymer.

8. A method according to claim 1 wherein said fill material is selected for its acoustic damping characteristics.

9. A method according to claim 1 wherein said fill material is selected for its strength characteristics.

10. A method for manufacturing a composite part, comprising the steps of:
    forming a polymer material into a shape whose outer surface has a desired part configuration;
    applying a base coating to substantially all of said outer surface leaving at least one access to said polymer material, said base coating including a selected metal existing as a constituent thereof;
    spraying, in atomized form, said selected metal on said base coating covered outer surface, said selected metal molecularly bonding only to said selected metal existing as a constituent of said base coating thereby maintaining said at least one access to said polymer material;
    contacting, by means of said at least one access, said polymer material with a polymer solvent selected to molecularly break down said polymer material for exiting said at least one access, wherein said selected metal bonded with said selected metal existing as a constituent of said base coating forms a metallic shell substantially void of said polymer material; and
    introducing, by means of said at least one access, a fill material into said metallic shell for forming said composite part.

11. A method according to claim 10 wherein said step of forming is a computer aided design/computer aided manufacturing process.

12. A method according to claim 10 wherein said step of spraying comprises a plasma spray process.

13. A method according to claim 10 further comprising the step of spraying, in atomized form, ceramic material on top of said selected metal, said ceramic material being a ceramic capable of molecularly bonding with said selected metal.

14. A method acceding to claim 10 wherein said selected metal is selected from the group consisting of aluminum and aluminum alloys.

15. A method according to claim 10 wherein said polymer material is an organically soluble polymer.

* * * * *